United States Patent
Okimoto et al.

(10) Patent No.: US 10,921,804 B2
(45) Date of Patent: Feb. 16, 2021

(54) VEHICLE CONTROL SYSTEM, VEHICLE CONTROL METHOD, AND VEHICLE CONTROL PROGRAM

(71) Applicant: HONDA MOTOR CO., LTD., Tokyo (JP)

(72) Inventors: Kohei Okimoto, Wako (JP); Yoshitaka Mimura, Wako (JP); Naotaka Kumakiri, Wako (JP); Masahiko Asakura, Wako (JP); Naoto Sen, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 159 days.

(21) Appl. No.: 16/083,907

(22) PCT Filed: Mar. 15, 2016

(86) PCT No.: PCT/JP2016/058160
§ 371 (c)(1),
(2) Date: Sep. 11, 2018

(87) PCT Pub. No.: WO2017/158726
PCT Pub. Date: Sep. 21, 2017

(65) Prior Publication Data
US 2019/0086917 A1    Mar. 21, 2019

(51) Int. Cl.
*G05D 1/00*    (2006.01)
*B60W 40/08*    (2012.01)
(Continued)

(52) U.S. Cl.
CPC .......... *G05D 1/0061* (2013.01); *B60W 30/00* (2013.01); *B60W 40/08* (2013.01); *B60W 50/08* (2013.01);
(Continued)

(58) Field of Classification Search
None
See application file for complete search history.

(56) References Cited

U.S. PATENT DOCUMENTS

| | | | |
|---|---|---|---|
| 8,825,258 B2 * | 9/2014 | Cullinane | B60K 37/06 |
| | | | 701/23 |
| 2012/0212353 A1 | 8/2012 | Fung et al. | |

(Continued)

FOREIGN PATENT DOCUMENTS

| | | |
|---|---|---|
| CN | 101837777 | 9/2010 |
| CN | 102975768 | 3/2013 |

(Continued)

OTHER PUBLICATIONS

International Search Report and Written Opinion for International Patent Application No. PCT/JP2016/058160 dated Jun. 14, 2016, 11 pages.

(Continued)

*Primary Examiner* — Kenny S Lin
(74) *Attorney, Agent, or Firm* — Amin, Turocy & Watson, LLP

(57) ABSTRACT

A vehicle control system includes an automatic driving control unit configured to automatically control at least one of acceleration or deceleration and steering of a subject vehicle, an operation reception unit configured to receive an operation of a vehicle occupant of the subject vehicle, an estimation unit configured to estimate a state of the vehicle occupant, and an override control unit configured to perform an override for switching from automatic driving to manual driving on the basis of the operation from the vehicle occupant received by the operation reception unit and suppress the override in a case where a decrease of a driving intention of the vehicle occupant is estimated by the estimation unit.

6 Claims, 11 Drawing Sheets

(51) Int. Cl.
   *B60W 50/08* (2020.01)
   *B60W 30/00* (2006.01)
   *G05D 1/02* (2020.01)

(52) U.S. Cl.
   CPC ..... *B60W 2540/22* (2013.01); *B60W 2710/20* (2013.01); *B60W 2720/106* (2013.01); *G05D 1/0231* (2013.01); *G05D 1/0257* (2013.01); *G05D 2201/0213* (2013.01)

(56) References Cited

U.S. PATENT DOCUMENTS

| | | | | |
|---|---|---|---|---|
| 2015/0032322 | A1* | 1/2015 | Wimmer | B60K 35/00 |
| | | | | 701/23 |
| 2016/0159251 | A1* | 6/2016 | Ebina | B60N 2/0248 |
| | | | | 701/49 |
| 2016/0207538 | A1* | 7/2016 | Urano | G05D 1/0061 |
| 2016/0209840 | A1* | 7/2016 | Kim | G05D 1/0061 |
| 2016/0244070 | A1* | 8/2016 | Bendewald | B62D 1/185 |
| 2016/0246298 | A1* | 8/2016 | Sato | B60W 40/08 |
| 2016/0252903 | A1* | 9/2016 | Prokhorov | B60W 40/02 |
| | | | | 701/23 |
| 2016/0259334 | A1* | 9/2016 | Hashimoto | G05D 1/0061 |
| 2016/0264021 | A1* | 9/2016 | Gillett | B60K 7/0007 |
| 2017/0021837 | A1* | 1/2017 | Ebina | B60W 50/082 |
| 2017/0220039 | A1* | 8/2017 | Funakawa | B60W 50/14 |
| 2017/0341648 | A1* | 11/2017 | Sanma | B60W 50/14 |
| 2017/0364070 | A1* | 12/2017 | Oba | G05D 1/0061 |
| 2019/0146489 | A1* | 5/2019 | Zaizen | B60W 60/0053 |
| | | | | 701/42 |
| 2020/0101977 | A1* | 4/2020 | Nakai | B60W 50/14 |

FOREIGN PATENT DOCUMENTS

| | | |
|---|---|---|
| CN | 103818380 | 5/2014 |
| JP | 2005-173635 | 6/2005 |
| JP | 2005-225279 | 8/2005 |
| JP | 2007-203913 | 8/2007 |
| JP | 2008-120271 | 5/2008 |
| JP | 2008-123449 | 5/2008 |
| JP | 2008-201311 | 9/2008 |
| JP | 2010-125921 | 6/2010 |
| JP | 2012-051441 | 3/2012 |
| JP | 2012-111263 | 6/2012 |
| JP | 6003111 | 8/2012 |
| JP | 2015-110411 | 6/2015 |

OTHER PUBLICATIONS

Japanese Office Action for Japanese Patent Application No. 2018-505110 dated Dec. 3, 2019.
Chinese Office Action for Chinese Patent Application No. 201680083401.5 dated Sep. 27, 2020.

* cited by examiner

VEHICLE CONTROL SYSTEM, VEHICLE CONTROL METHOD, AND VEHICLE CONTROL PROGRAM

TECHNICAL FIELD

The present invention relates to a vehicle control system, a vehicle control method, and a vehicle control program.

BACKGROUND ART

In recent years, research on a technique for automatically controlling at least one of acceleration or deceleration and steering of a subject vehicle so that the subject vehicle travels along a route to a destination (hereinafter referred to as automatic driving) has progressed. In relation to this, a technique for performing an override for switching from automatic driving to manual driving in a case where a steering operation by a vehicle occupant is detected is disclosed (for example, refer to Patent Literature 1).

CITATION LIST

Patent Literature

[Patent Literature 1]
Japanese Unexamined Patent Application, First Publication No. 2012-051441

SUMMARY OF INVENTION

Technical Problem

However, during automatic driving, a driving intention of the vehicle occupant may decrease in some cases, and in this case, the override may be started in a state in which the vehicle occupant does not intend in some cases.

The present invention is made in consideration of such circumstances, and an object of the present invention is to provide a vehicle control system, a vehicle control method, and a vehicle control program capable of suppressing implementation of an unsuitable override.

Solution to Problem

According to the invention of claim 1, a vehicle control system (100) includes an automatic driving control unit (120) configured to automatically control at least one of acceleration or deceleration and steering of a subject vehicle, an operation reception unit (70) configured to receive an operation of a vehicle occupant of the subject vehicle, an estimation unit (152) configured to estimate a state of the vehicle occupant, and an override control unit (154) configured to perform an override for switching a mode from automatic driving to manual driving on the basis of the operation from the vehicle occupant received by the operation reception unit and suppress the override in a case where a decrease of a driving intention of the vehicle occupant is estimated by the estimation unit.

According to the invention of claim 2, in the vehicle control system of claim 1, the estimation unit estimates the state of the vehicle occupant on the basis of information obtained from a seat (300) on which the vehicle occupant is seated.

According to the invention of claim 3, in the vehicle control system of claim 2, in a case where a backrest portion of the seat on which the vehicle occupant is seated is inclined by a predetermined angle or more, the estimation unit estimates the decrease of the driving intention of the vehicle occupant.

According to the invention of claim 4, in the vehicle control system of claim 2, the estimation unit estimates the decrease of the driving intention of the vehicle occupant on the basis of a load distribution on the seat on which the vehicle occupant is seated.

According to the invention of claim 5, the vehicle control system of claim 1 includes an imaging unit (400) configured to image a space in the subject vehicle, and the estimation unit estimates the state of the vehicle occupant on the basis of an image captured by the imaging unit.

According to the invention of claim 6, in the vehicle control system of claim 1, the override control unit accommodates at least a part of an operation element performing a driving operation by the vehicle occupant of the subject vehicle according to a determination of the suppression of the override.

According to the invention of claim 7, in the vehicle control system of claim 1, in a case where the suppression of the override is determined by the override control unit, the automatic driving control unit limits a lane change and/or the acceleration or deceleration of the subject vehicle.

According to the invention of claim 8, in the vehicle control system of claim 1, in a case where it is estimated that a fixing portion fixing a posture is used by the vehicle occupant, the estimation unit estimates that the driving intention of the vehicle occupant is low.

According to the invention of claim 9, in the vehicle control system of claim 1, the estimation unit derives information obtained by converting a degree of the driving intention of the vehicle occupant to a numerical value, compares the derived numerical value with a threshold value for estimating whether or not the driving intention of the vehicle occupant is decreasing, and sets a condition for performing the override to a side on which the override is unlikely to be performed in a case where the numerical value is equal to or less than the threshold value.

According to the invention of claim 10, in the vehicle control system of claim 9, the override control unit returns the condition for performing the override to a reference value in a case where a state in which the derived numerical value is greater than the threshold value continues for a predetermined time or more after setting the condition for performing the override to be high.

According to the invention of claim 11, a vehicle control method causes an in-vehicle computer to automatically control at least one of acceleration or deceleration and steering of a subject vehicle, receive an operation of a vehicle occupant of the subject vehicle by an operation reception unit, estimate a state of the vehicle occupant, perform an override for switching from automatic driving to manual driving on the basis of the operation from the vehicle occupant received by the operation reception unit; and suppress the override in a case where a decrease of a driving intention of the vehicle occupant is estimated by the estimation of the state of the vehicle occupant.

According to the invention of claim 12, a vehicle control program causes an in-vehicle computer to execute processing of automatically controlling at least one of acceleration or deceleration and steering of a subject vehicle, receiving an operation of a vehicle occupant of the subject vehicle by an operation reception unit, estimating a state of the vehicle occupant, performing an override for switching from automatic driving to manual driving on the basis of the operation from the vehicle occupant received by the operation reception unit, and suppressing the override in a case where a decrease of a driving intention of the vehicle occupant is estimated by the estimation of the state of the vehicle occupant.

Advantageous Effects of Invention

According to the invention of claims 1, 11, and 12, it is possible to suppress implementation of an unsuitable override by estimating the decrease of the driving intention of the vehicle occupant to suppress the override.

According to the invention of claims 2 to 4, it is possible to more accurately estimate the decrease of the driving intention of the vehicle occupant on the basis of the state of the seat in which the decrease of the driving intention of the vehicle occupant easily appears.

According to the invention of claim 5, it is possible to more accurately estimate the decrease of the driving intention of the vehicle occupant.

According to the invention of claim 6, at least a part of the operation element performing the driving operation by the vehicle occupant of the subject vehicle is accommodated according to the determination of the suppression of the override. Therefore, it is possible to prevent an erroneous operation by the vehicle occupant.

According to the invention of claim 7, in a case where the suppression of the override is determined, the lane change and/or the acceleration or deceleration of the subject vehicle is limited. Therefore, it is possible to realize stable traveling by decreasing a possibility of the override being performed. This is because the vehicle occupant is considered to touch the operation element unintentionally in a situation in which the subject vehicle performs the lane change or in a situation in which the acceleration or deceleration is changed.

According to the invention of claim 8, it is possible to estimate a state in which the vehicle occupant is resting, sleeping, or the like by estimating that the fixing portion is being used. Therefore, it is possible to accurately estimate that the driving intention of the vehicle occupant is low.

According to the invention of claim 9, in a case where the decrease of the driving intention by the vehicle occupant is estimated, the condition for performing the override is set to the side on which the override is unlikely to be performed. Therefore, it is possible to prevent the override by an erroneous operation of the operation element or the like.

According to the invention of claim 10, in a case where the driving intention of the vehicle occupant is high, it is possible to perform the override under a suitable condition.

DESCRIPTION OF EMBODIMENTS

Hereinafter, embodiments of a vehicle control system, a vehicle control method, and a vehicle control program of the present invention will be described with reference to the drawings.

<Common Constitution>

Figure 1:
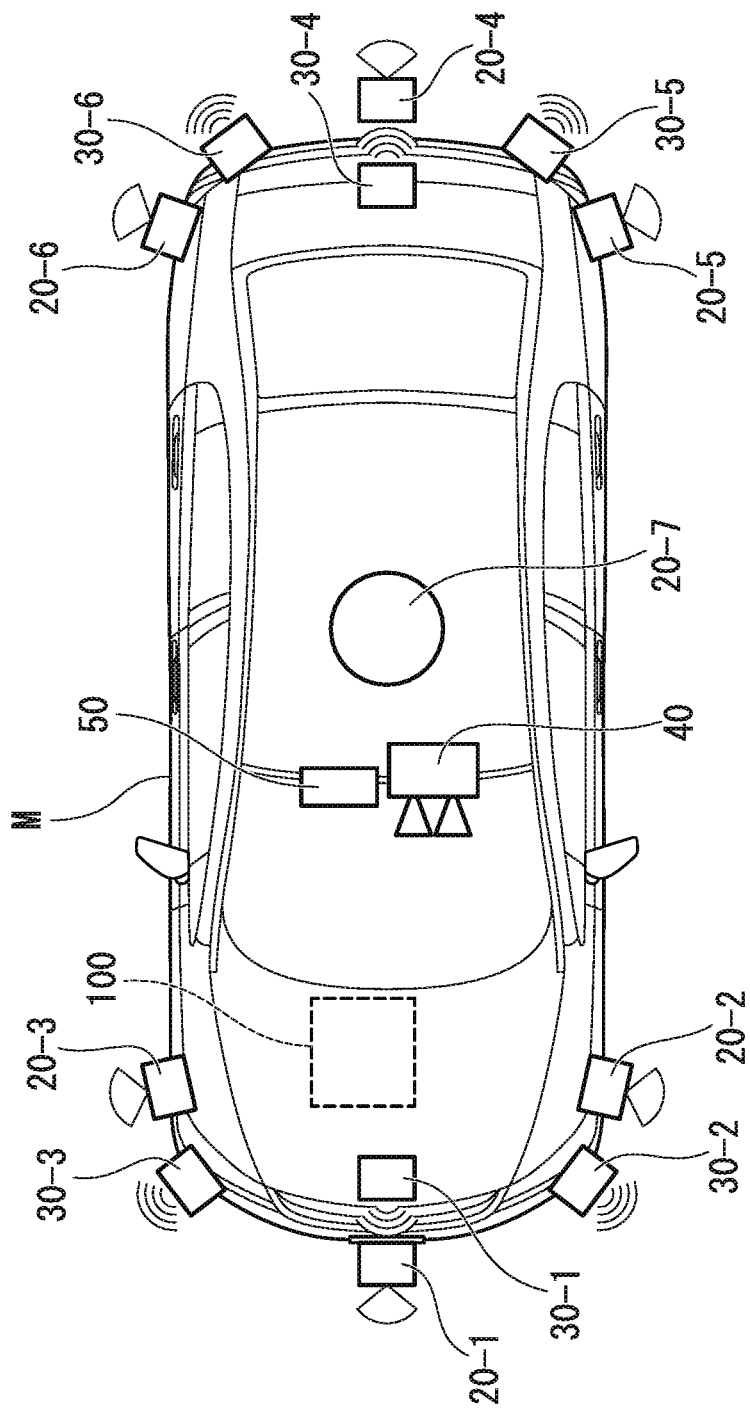
FIG. 1 is a diagram illustrating a constitution element of a vehicle in which a vehicle control system 100 of an embodiment is mounted.

FIG. 1 is a diagram illustrating a constitution element of a vehicle in which a vehicle control system 100 of an embodiment is mounted (hereinafter referred to as a subject vehicle M). For example, the vehicle in which the vehicle control system 100 is mounted is a vehicle such as a two-wheeled vehicle, a three-wheeled vehicle, or a four-wheeled vehicle, and may be a vehicle using an internal combustion engine such as a diesel engine or a gasoline engine as a power source, an electric vehicle using an electric motor as a power source, a hybrid vehicle including an internal combustion engine and an electric motor, or the like. For example, the electric vehicle is driven using electric power discharged by a battery such as a secondary battery, a hydrogen fuel cell, a metal fuel cell, or an alcohol fuel cell.

As shown in FIG. 1, sensors such as viewfinders 20-1 to 20-7, radars 30-1 to 30-6, a camera 40, a navigation device (a display unit) 50, and the vehicle control system 100 are mounted on the subject vehicle M.

For example, the viewfinders 20-1 to 20-7 use light detection and ranging or laser imaging detection and ranging (LIDAR) in which scattered light from irradiation light is measured to measure a distance to an object. For example, the viewfinder 20-1 is attached to a front grille or the like, and the viewfinders 20-2 and 20-3 are attached to a side surface of a vehicle body, a door mirror, the inside of a headlight, in the vicinity of a side lamp, or the like. The viewfinder 20-4 is attached to a trunk lid or the like, and the viewfinders 20-5 and 20-6 are attached to the side surface of the vehicle body, the inside of a taillight, or the like. For example, the viewfinders 20-1 to 20-6 described above have a detection region of about 150 degrees with respect to a horizontal direction. In addition, the viewfinder 20-7 is attached to a roof or the like. For example, the viewfinder 20-7 has a detection region of 360 degrees with respect to the horizontal direction.

For example, the radars 30-1 and 30-4 are long distance millimeter wave radars of which the detection region in a depth direction is wider than those of other radars. In addition, the radars 30-2, 30-3, 30-5, and 30-6 are intermediate distance millimeter wave radars of which the detection region in a depth direction is narrower than those of the radars 30-1 and 30-4.

Hereinafter, the viewfinders 20-1 to 20-7 are simply referred to as "viewfinder 20" in a case where the viewfinders 20-1 to 20-7 are not particularly distinguished from each other, and the radars 30-1 to 30-6 are simply referred to as "radar 30" in a case where the radars 30-1 to 30-6 are not particularly distinguished from each other. For example, the radar 30 detects an object by a frequency modulated continuous wave (FM-CW) method.

For example, the camera 40 is a digital camera using an individual state imaging device such as a charge coupled device (CCD) or a complementary metal oxide semiconductor (CMOS). The camera 40 is attached to an upper portion of a front windshield, a rear surface of the room mirror, or the like. For example, the camera 40 periodically images a front of the subject vehicle M repeatedly. The camera 40 may be a stereo camera including a plurality of cameras.

Note that the constitution shown in FIG. 1 is merely an example, and a part of the constitution may be omitted or another constitution may be added.

Figure 2:
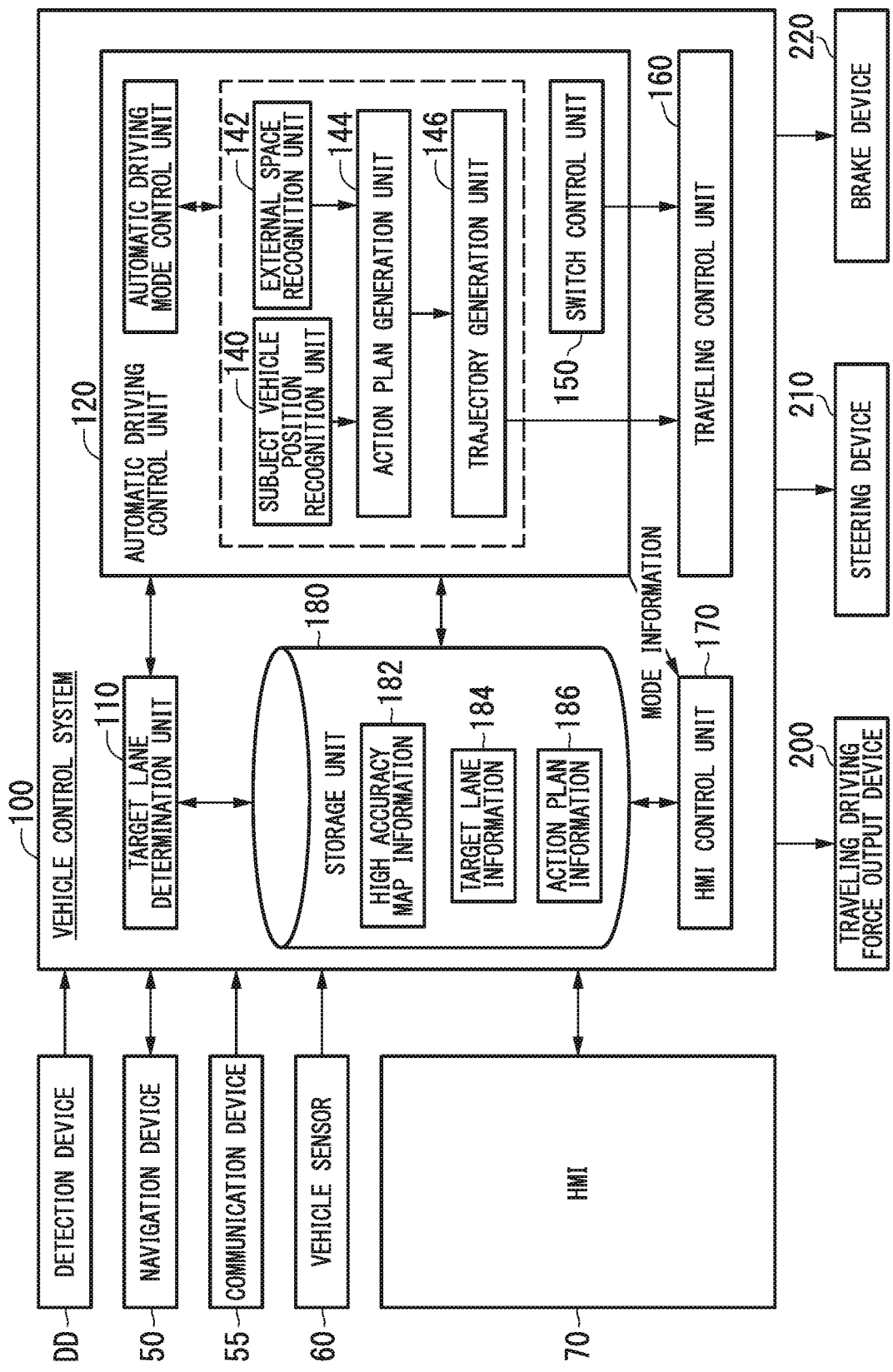
FIG. 2 is a functional constitution diagram centered on the vehicle control system 100 according to the present embodiment.

FIG. 2 is a functional constitution diagram centered on the vehicle control system 100 according to the present embodiment. A detection device DD including the viewfinder 20, the radar 30, the camera 40, and the like, the navigation device 50, a communication device 55, a vehicle sensor 60, a human machine interface (HMI) 70, the vehicle control system 100, a traveling driving force output device 200, a steering device 210, and a brake device 220 are mounted in the subject vehicle M. Such devices and apparatuses are connected with each other by a multiplex communication line such as a controller area network (CAN) communication line, a serial communication line, a wireless communication network, or the like. Note that the vehicle control system in the claims may include not only the "vehicle control system 100" but also the constitutions other than the vehicle control system 100 (the detection device unit DD, the HMI 70, or the like).

The navigation device 50 includes a global navigation satellite system (GNSS) receiver, map information (a navigation map), a touch panel type display device functioning as a user interface, a speaker, a microphone, and the like. The navigation device 50 specifies a position of the subject vehicle M by the GNSS receiver and derives a route from the position to a destination designated by a user. The route derived by the navigation device 50 is provided to a target lane determination unit 110 of the vehicle control system 100. The position of the subject vehicle M may be specified or supplemented by an inertial navigation system (INS) using an output of the vehicle sensor 60. In addition, when the vehicle control system 100 is executing a manual driving mode, the navigation device 50 performs guidance on the route to the destination by sound or a navigation display. Note that the constitution for specifying the position of the subject vehicle M may be provided independently from the navigation device 50. In addition, for example, the navigation device 50 may be realized by a function of a terminal device such as a smartphone or a tablet terminal possessed by the user. In this case, transmission and reception of information is performed between the terminal device and the vehicle control system 100 by wireless or wired communication.

For example, the communication device 55 performs wireless communication using a cellular network, a Wi-Fi network, Bluetooth (registered trademark), dedicated short range communication (DSRC), or the like.

The vehicle sensor 60 includes a vehicle speed sensor that detects a vehicle speed, an acceleration sensor that detects acceleration, a yaw rate sensor that detects an angular velocity around a vertical axis, a direction sensor that detects a direction of the subject vehicle M, and the like.

Figure 3:
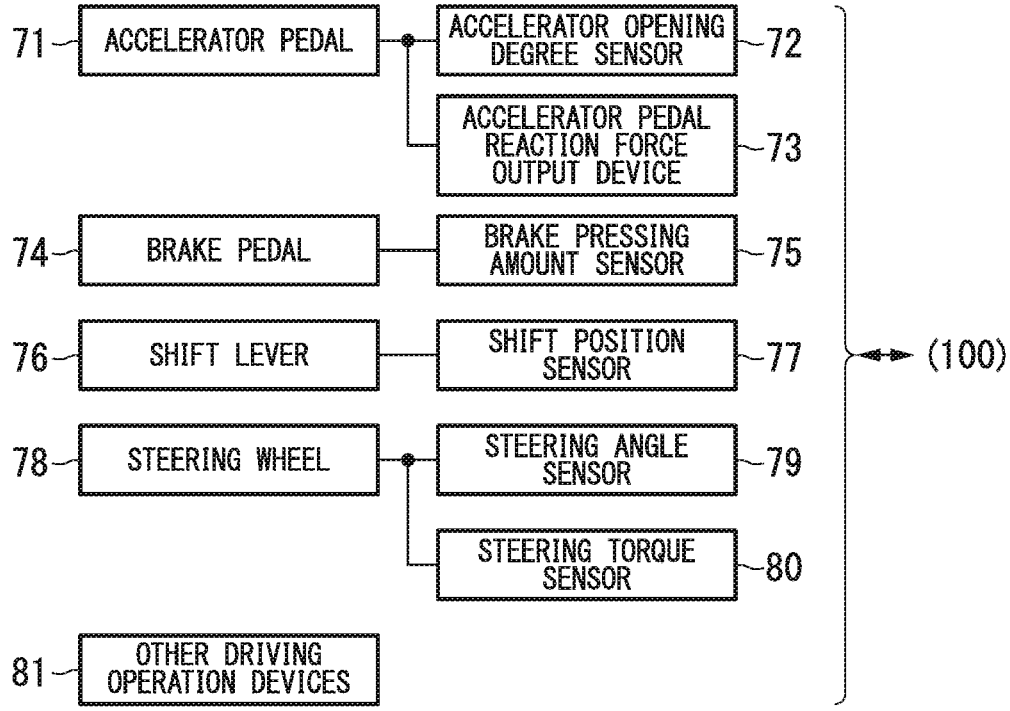
FIG. 3 is a constitution diagram of an HMI 70.
Figure 3:
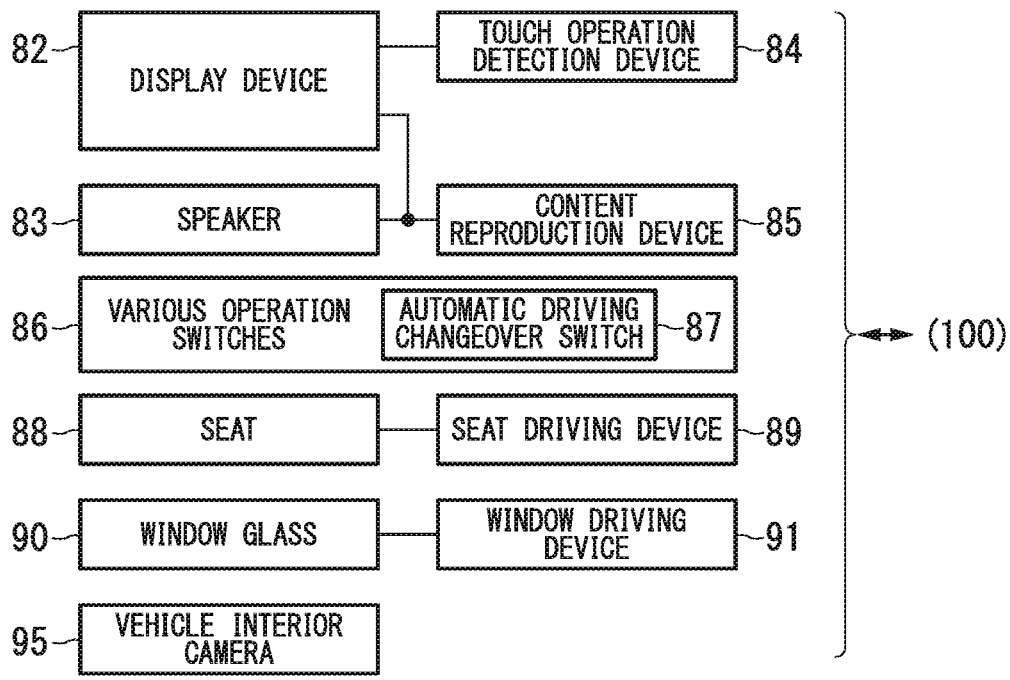

FIG. 3 is a constitution diagram of the HMI 70. For example, the HMI 70 includes a constitution of a driving operation system and a constitution of a non-driving operation system. A boundary of the constitution of the driving operation system and the constitution of the non-driving operation system is not clear, and the constitution of the driving operation system may have a function of the non-driving operation system (or vice versa). In addition, such a driving operation system is an example of an operation reception unit that receives an operation of a vehicle occupant of the subject vehicle M.

For example, as the constitution of the driving operation system, the HMI 70 includes an accelerator pedal 71, an accelerator opening degree sensor 72, an accelerator pedal reaction force output device 73, a brake pedal 74, a brake pressing amount sensor (or master pressure sensor or the like) 75, a shift lever 76, a shift position sensor 77, a steering wheel 78, a steering angle sensor 79, a steering torque sensor 80, and other driving operation devices 81.

The accelerator pedal 71 is an operation element for receiving an acceleration instruction by the vehicle occupant (or a deceleration instruction by a return operation). The accelerator opening degree sensor 72 detects a pressing amount of the accelerator pedal 71 and outputs an accelerator opening degree signal indicating the pressing amount to the vehicle control system 100. Note that the accelerator opening degree signal may be directly output to the traveling driving force output device 200, the steering device 210, or the brake device 220 instead of being output to the vehicle control system 100. This also applies to a constitution of another driving operation system described below. For example, the accelerator pedal reaction force output device 73 outputs a force (an operation reaction force) in a direction opposite to an operation direction to the accelerator pedal 71 according to an instruction from the vehicle control system 100.

The brake pedal 74 is an operation element for receiving a deceleration instruction by the vehicle occupant. The brake pressing amount sensor 75 detects the pressing amount (or pressing force) of the brake pedal 74 and outputs a brake signal indicating a detection result to the vehicle control system 100.

The shift lever 76 is an operation element for receiving a change instruction of a shift stage by the vehicle occupant. The shift position sensor 77 detects the shift stage instructed by the vehicle occupant and outputs a shift position signal indicating a detection result to the vehicle control system 100.

The steering wheel 78 is an operation element for receiving a turn instruction by the vehicle occupant. The steering angle sensor 79 detects a steering angle of the steering wheel 78 and outputs a steering angle signal indicating a detection result to the vehicle control system 100. The steering torque sensor 80 detects a torque applied to the steering wheel 78 and outputs a steering torque signal indicating a detection result to the vehicle control system 100. Note that an operation reaction force may be output to the steering wheel 78 by outputting a torque to a steering shaft, for example, by a reaction force motor or the like, as control related to the steering wheel 78.

For example, the other driving operation devices 81 are a joystick, a button, a dial switch, a graphic user interface (GUI) switch, and the like. The other driving operation devices 81 receive the acceleration instruction, the deceleration instruction, the turn instruction, and the like, and output the acceleration instruction, the deceleration instruction, the turn instruction, and the like to the vehicle control system 100.

For example, as the non-driving operation system, the HMI 70 includes a display device (a display unit) 82, a speaker 83, a touch operation detection device 84, a content reproduction device 85, various operation switches 86, a seat 88, a seat driving device 89, a window glass 90, a window driving device 91, and a vehicle interior camera 95.

For example, the display device 82 is attached to each part of an instrument panel, an arbitrary position facing a passenger's seat or a rear seat, or the like, and is a liquid crystal display (LCD), an organic electroluminescence (EL) display device, or the like. In addition, the display device 82 may be a head up display (HUD) that projects an image onto a front windshield or another window. The speaker 83 outputs sound. In a case where the display device 82 is a touch panel, the touch operation detection device 84 detects a contact position (a touch position) on a display screen of the display device 82 and outputs the touch position to the vehicle control system 100. Note that the touch operation detection device 84 may be omitted in a case where the display device 82 is not a touch panel.

The content reproduction device 85 includes, for example, a digital versatile disc (DVD) reproduction device, a compact disc (CD) reproduction device, a television receiver, a reproduction device of various guide images, and the like. Some or all of the display device 82, the speaker 83, the touch operation detection device 84, and the content reproduction device 85 may be common to the navigation device 50.

The various operation switches 86 are disposed at arbitrary positions in an interior of the vehicle. The various operation switches 86 include an automatic driving changeover switch 87 for instructing the start (or the future start) and the stop of the automatic driving. The automatic driving changeover switch 87 may be either a graphical user interface (GUI) switch or a mechanical switch. In addition, the various operation switches 86 may include a switch for driving the seat driving device 89 or the window driving device 91.

The seat 88 is a seat on which the vehicle occupant sits. The seat driving device 89 freely drives a reclining angle, back and forth direction and position, a yaw angle, and the like of the seat 88. For example, the window glass 90 is provided at each door. The window driving device 91 drives the window glass 90 to open and close the window glass 90.

The vehicle interior camera 95 is a digital camera using an individual imaging device such as a CCD or a CMOS. The vehicle interior camera 95 is attached at a position where it is possible to image at least a head of the vehicle occupant who performs the driving operation, such as a rearview mirror, a steering boss portion, or the instrument panel. For example, the camera 40 repeatedly images the vehicle occupant periodically.

Prior to the description of the vehicle control system 100, the traveling driving force output device 200, the steering device 210, and the brake device 220 will be described.

The traveling driving force output device 200 outputs traveling driving force (torque) for enabling the vehicle to travel to driving wheels. For example, in a case where the subject vehicle M is a vehicle using an internal combustion engine as a power source, the traveling driving force output device 200 includes an engine and a transmission and an engine electronic control unit (ECU) that controls the engine. In a case where the subject vehicle M is an electric vehicle using an electric motor as a power source, the traveling driving force output device 200 includes a traveling motor and a motor ECU that controls the traveling motor. In a case where the subject vehicle M is a hybrid vehicle, the traveling driving force output device 200 includes an engine, a transmission, an engine ECU, a traveling motor, and the motor ECU. In a case where the traveling driving force output device 200 includes only the engine, the engine ECU adjusts a throttle opening degree of the engine, a shift stage, or the like according to information input from the traveling control unit 160 that will be described later. In a case where the traveling driving force output device 200 includes only the traveling motor, the motor ECU adjusts a duty ratio of a PWM signal to be supplied to the traveling motor according to the information input from the traveling control unit 160. In a case where the traveling driving force output device 200 includes the engine and the traveling motor, the engine ECU and the motor ECU cooperate with each other to control the traveling driving force according to the information input from the traveling control unit 160.

For example, the steering device 210 includes a steering ECU and an electric motor. For example, the electric motor changes a direction of steerable wheels by applying a force to a rack and pinion mechanism. The steering ECU drives the electric motor according to information input from the vehicle control system 100 or information on an input steering angle or steering torque and changes the direction of the steerable wheels.

For example, the brake device 220 is an electric servo brake device including a brake caliper, a cylinder that transfers hydraulic pressure to the brake caliper, an electric motor that generates the hydraulic pressure in the cylinder, and a brake control unit. The brake control unit of the electric servo brake device controls the electric motor according to the information input from the traveling control unit 160 and outputs the brake torque corresponding to the brake operation to each wheel. The electric servo brake device may include a mechanism that transfers the hydraulic pressure generated by an operation of the brake pedal to the cylinder through a master cylinder as a backup. Note that the brake device 220 is not limited to the above-described electric servo brake device but may be an electronically controlled hydraulic brake device. The electronically controlled hydraulic brake device controls an actuator according to the information input from the traveling control unit 160 and transfers the hydraulic pressure of the master cylinder to the cylinder. In addition, the brake device 220 may include a regenerative brake by the traveling motor that may be included in the traveling driving force output device 200.

[Vehicle Control System]

Hereinafter, the vehicle control system 100 will be described. For example, the vehicle control system 100 is realized by one or more processors or hardware having an equivalent function. The vehicle control system 100 may have a constitution in which an electronic control unit (ECU) in which a processor such as a central processing unit (CPU), a storage device, and a communication interface are connected with each other by an internal bus, a microprocessing unit (MPU), and the like are combined with each other.

Returning to FIG. 2, for example, the vehicle control system 100 includes the target lane determination unit 110, an automatic driving control unit 120, the traveling control unit 160, an HMI control unit 170, and a storage unit 180.

For example, the automatic driving control unit 120 includes an automatic driving mode control unit 130, a subject vehicle position recognition unit 140, an external space recognition unit 142, an action plan generation unit 144, a trajectory generation unit 146, and the switch control unit 150. Some or all of the target lane determination unit 110, each unit of the automatic driving control unit 120, the traveling control unit 160, and the HMI control unit 170 are realized by a processor executing a program (software). In addition, some or all of these may be realized by hardware such as a large scale integration (LSI) or an application specific integrated circuit (ASIC) or may be realized by a combination of software and hardware.

For example, the storage unit 180 stores information such as high accuracy map information 182, target lane information 184, and action plan information 186. The storage unit 180 is realized by a read only memory (ROM), a random access memory (RAM), a hard disk drive (HDD), a flash memory, or the like. The program executed by the processor may be stored in the storage unit 180 in advance or may be downloaded from an external device through an in-vehicle Internet facility or the like. In addition, the program may be installed in the storage unit 180 when a portable storage medium storing the program is mounted in a drive device that is not shown. In addition, the vehicle control system 100 may be distributed among a plurality of computer devices.

For example, the target lane determination unit 110 is realized by the MPU. The target lane determination unit 110 divides the route provided from the navigation device 50 into a plurality of blocks (for example, divides the route every 100 [m] with respect to the vehicle traveling direction) and determines a target lane for each block with reference to the high accuracy map information 182. For example, the target lane determination unit 110 determines the number from the left of the lane that the vehicle travels on. For example, in a case where there is a branching position, a merging position, or the like on the route, the target lane determination unit 110 determines the target lane so that the subject vehicle M may travel on a reasonable traveling route for progressing to a branch destination. The target lane determined by the target lane determination unit 110 is stored in the storage unit 180 as the target lane information 184.

The high accuracy map information 182 is map information with higher accuracy than a navigation map included in the navigation device 50. For example, the high accuracy map information 182 includes information on the center of a lane or information on a boundary of a lane. In addition, the high accuracy map information 182 may include road information, traffic regulation information, address information (an address and a postal code), facility information, telephone number information, and the like. The road information includes information indicating a type of a road such as an expressway, a toll road, a national highway, or a prefectural road, or information on the number of lanes of the road, the width of each lane, a gradient of the road, the position of the road (three-dimensional coordinates including the longitude, the latitude, and the height), the curvature of a curve of a lane, the positions of junction and branch points of a lane, a sign provided on the road, and the like. The traffic regulation information includes information that lanes are blocked due to construction, a traffic accident, traffic congestion, or the like.

The automatic driving control unit 120 automatically controls at least one of acceleration or deceleration and steering of the subject vehicle M so that the subject vehicle M travels along the route to the destination. In addition, in a case where a degree of a driving intention of the vehicle occupant is equal to or less than a threshold value by an override control unit that will be described later, the automatic driving control unit 120 may limit the lane change or the acceleration or deceleration of the subject vehicle M.

The automatic driving mode control unit 130 determines a mode of the automatic driving executed by the automatic driving control unit 120. The mode of the automatic driving in the present embodiment includes the following modes. Note that the following are merely examples, and the number of the modes of the automatic driving may be arbitrarily determined.

[First Mode]

The first mode is a mode in which a degree of the automatic driving is the highest compared to other modes. In a case where the first mode is being executed, all vehicle controls such as complicated merging control are automatically performed, and thus the vehicle occupant does not need to monitor surroundings or a state of the subject vehicle M.

[Second Mode]

The second mode is a mode in which a degree of the automatic driving is next highest after the first mode. In a case where the second mode is being executed, in principle, all vehicle controls are automatically performed, but the driving operation of the subject vehicle M is entrusted to the vehicle occupant according to a situation. Therefore, the vehicle occupant needs to monitor the surroundings or state of the vehicle M.

[Third Mode]

The third mode is a mode in which a degree of the automatic driving is next highest after the second mode. In a case where the third mode is being executed, the vehicle occupant needs to perform a confirmation operation on the HMI 70 according to the situation. For example, in the third mode, in a case where the vehicle occupant is notified of a timing of a lane change and the vehicle occupant performs an operation for instructing the HMI 70 to change lanes, an automatic lane change is performed. Therefore, the vehicle occupant needs to monitor the surroundings or state of the subject vehicle M.

The automatic driving mode control unit 130 determines the mode of the automatic driving on the basis of the operation of the vehicle occupant with respect to the HMI 70, an event determined by the action plan generation unit 144, a traveling aspect determined by the trajectory generation unit 146, and the like. The HMI control unit 170 is notified of the mode of the automatic driving. In addition, a limit according to performance or the like of the detection device DD of the subject vehicle M may be set in the mode of the automatic driving. For example, in a case where the performance of the detection device DD is low, the first mode may not be performed.

In any mode, it is possible to switch (override) to the manual driving mode by an operation for a constitution of a driving operation system in the HMI 70. For example, the override is started in a case where an operation for the driving operation system of the HMI 70 by the vehicle occupant of the subject vehicle M continues for a predetermined time or more, in a case where the operation for the driving operation system is equal to or greater than a predetermined operation change amount (for example, the accelerator opening degree of the accelerator pedal 71, the brake pressing amount of the brake pedal 74, the steering angle of the steering wheel 78), or in a case where the operation for the driving operation system has been performed a predetermined number of times of more. The predetermined time, the operation change amount, the predetermined number of times, and the like described above are examples of a condition (a threshold value) for determining whether or not to perform the override.

The subject vehicle position recognition unit 140 of the automatic driving control unit 120 recognizes a lane in which the subject vehicle M is traveling (a traveling lane) and a relative position of the subject vehicle M with respect to the traveling lane on the basis of the high accuracy map information 182 stored in the storage unit 180, and the information input from the viewfinder 20, the radar 30, the camera 40, the navigation device 50, or the vehicle sensor 60.

For example, the subject vehicle position recognition unit 140 may recognize the traveling lane by comparing a pattern of road lane lines (for example, an arrangement of solid lines and broken lines) recognized from the high accuracy map information 182 with a pattern of road lane lines near the subject vehicle M recognized from the image captured by the camera 40. In the recognition, the position of the subject vehicle M acquired from the navigation device 50 or the process result by the INS may be included.

Figure 4:
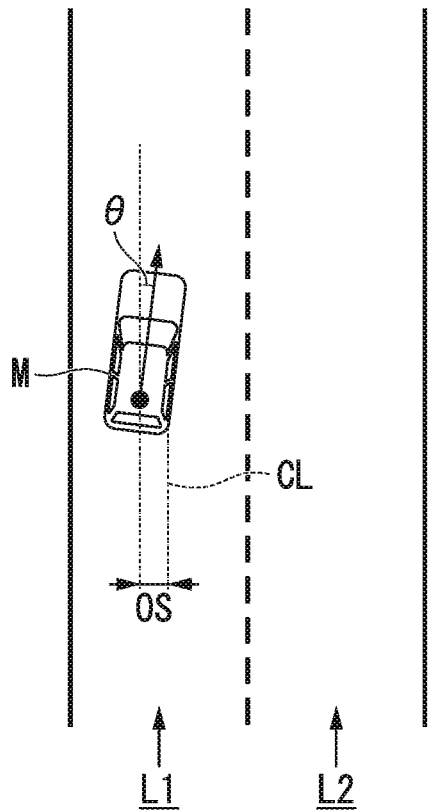
FIG. 4 is a diagram illustrating an aspect in which a relative position of a subject vehicle M with respect to a traveling lane L1 is recognized by a subject vehicle position recognition unit 140.

FIG. 4 is a diagram illustrating an aspect in which the relative position of the subject vehicle M with respect to a traveling lane L1 is recognized by the subject vehicle position recognition unit 140. For example, the subject vehicle position recognition unit 140 recognizes a deviation OS from a traveling lane center CL of a reference point (for example, a center of gravity) of the subject vehicle M and an angle θ formed with respect to a line connecting the traveling lane center CL of a direction of travel of the subject vehicle M, as the relative position of the subject vehicle M with respect to the traveling lane L1. In addition, instead of this, the subject vehicle position recognition unit 140 may recognize the position or the like of the reference point of the subject vehicle M with respect to one of side ends of the subject lane L1 as the relative position of the subject vehicle M with respect to the traveling lane. The relative position of the subject vehicle M recognized by the subject vehicle position recognition unit 140 is provided to the action plan generation unit 144.

The external space recognition unit 142 recognizes a state such as the position, the speed, and the acceleration of a nearby vehicle on the basis of the information input from the viewfinder 20, the radar 30, the camera 40, and the like. For example, the nearby vehicle is a vehicle traveling near the subject vehicle M and traveling in the same direction as the subject vehicle M. The position of the nearby vehicle may be indicated by a representative point such as a center of gravity or a corner of another vehicle or may be indicated by a region expressed by an outline of another vehicle. The "state" of the nearby vehicle may include an acceleration of the nearby vehicle or whether or not the nearby vehicle is changing lanes (or whether or not the nearby vehicle intends to change lanes) found on the basis of the information of the above-described various devices. In addition, the external space recognition unit 142 may recognize positions of a guardrail, a utility pole, a parked vehicle, a pedestrian, and other objects in addition to the nearby vehicle.

The action plan generation unit 144 sets a start point of the automatic driving and/or a destination of the automatic driving. The start point of the automatic driving may be a current position of the subject vehicle M or may be a point where the operation for instructing the automatic driving is performed. The action plan generation unit 144 generates an action plan in a section between the start point and the destination of the automatic driving. Note that the present invention is not limited thereto, and the action plan generation unit 144 may generate the action plan for an arbitrary section.

For example, the action plan includes a plurality of events that are sequentially executed. For example, the events include a deceleration event for decelerating the subject vehicle M, an acceleration event for accelerating the subject vehicle M, a lane keep event for causing the subject vehicle M to travel without deviating from the traveling lane, a lane change event for changing the traveling lane, an overtaking event for causing the subject vehicle M to overtake a preceding vehicle, a branch event for changing the subject vehicle M to a desired lane or causing the subject vehicle M to travel without deviating from the current traveling lane at a branch point, a merge event for causing the subject vehicle M to accelerate or decelerate and changing the traveling lane in the merge lane for merging the subject vehicle M to a main lane, and a handover event for shifting the mode from the manual driving mode to the automatic driving mode at the start point of the automatic driving or shifting the mode from the automatic driving mode to the manual driving mode at the end scheduled point of the automatic driving. The action plan generation unit 144 sets the lane change event, the branch event, or the merge event at a place where the target lane determined by the target lane determination unit 110 switches. Information indicating the action plan generated by the action plan generation unit 144 is stored in the storage unit 180 as the action plan information 186.

Figure 5:
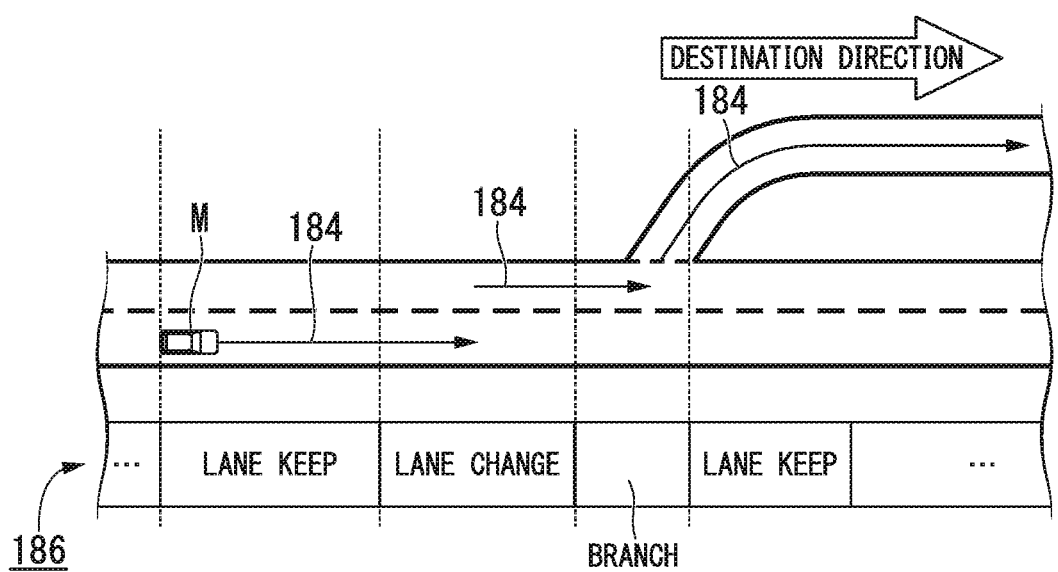
FIG. 5 is a diagram illustrating an example of an action plan generated for a certain section.

FIG. 5 is a diagram illustrating an example of the action plan generated for a certain section. As shown in FIG. 5, the action plan generation unit 144 generates the action plan necessary for the subject vehicle M to travel on the target lane indicated by the target lane information 184. Note that the action plan generation unit 144 may dynamically change the action plan regardless of the target lane information 184 according to a situation change of the subject vehicle M. For example, in a case where the speed of the nearby vehicle recognized by the external space recognition unit 142 during the vehicle traveling is greater than a threshold value or a movement direction of the nearby vehicle traveling in a lane adjacent to the subject lane faces toward the subject lane, the action plan generation unit 144 changes the event set in a driving section where the subject vehicle M is scheduled to travel. For example, in a case where the event is set so that the lane change event is executed after the lane keep event, the action plan generation unit 144 may change an event next to the lane keep event from the lane change event to the deceleration event, the lane keep event, or the like in a case where it is determined that a vehicle proceeds at a speed equal to or greater than the threshold value from behind a lane of a lane change destination during the lane keep event by the recognition result of the external space recognition unit 142. As a result, the vehicle control system 100 can cause the subject vehicle M to automatically travel safely even in a case where a change occurs in a state of an external space.

Figure 6:
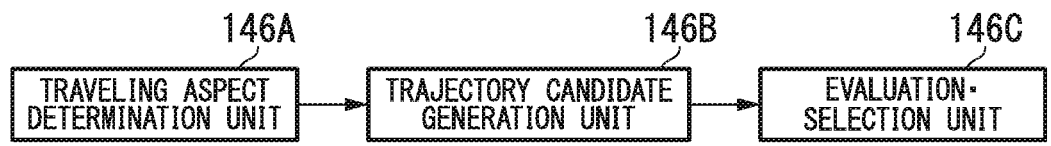
FIG. 6 is a diagram illustrating an example of a constitution of a trajectory generation unit 146.

FIG. 6 is a diagram illustrating an example of a constitution of the trajectory generation unit 146. For example, the trajectory generation unit 146 includes a traveling aspect determination unit 146A, a trajectory candidate generation unit 146B, and an evaluation•selection unit 146C.

For example, when the lane keep event is executed, the traveling aspect determination unit 146A determines one of traveling aspects among constant speed traveling, following traveling, low speed following traveling, deceleration traveling, curve traveling, obstacle avoidance traveling, and the like. For example, in a case where other vehicles are not present in front of the subject vehicle M, the traveling aspect determination unit 146A determines a traveling aspect as the constant speed traveling. In addition, in a case where following the preceding vehicle is performed, the traveling aspect determination unit 146A determines the traveling aspect as the following traveling. In addition, in a congestion situation or the like, the traveling aspect determination unit 146A determines the traveling aspect as the low speed following traveling. In addition, in a case where a deceleration of the preceding vehicle is recognized by the external space recognition unit 142 or in a case where an event of stopping, parking, or the like is implemented, the traveling aspect determination unit 146A determines the traveling aspect as the deceleration traveling. In addition, in a case where it is recognized that the subject vehicle M reaches a curve road by the external space recognition unit 142, the traveling aspect determination unit 146A determines the traveling aspect as the curve traveling. In addition, in a case where an obstacle is recognized in front of the subject vehicle M by the external space recognition unit 142, the traveling aspect determination unit 146A determines the traveling aspect as the obstacle avoidance traveling.

Figure 7:
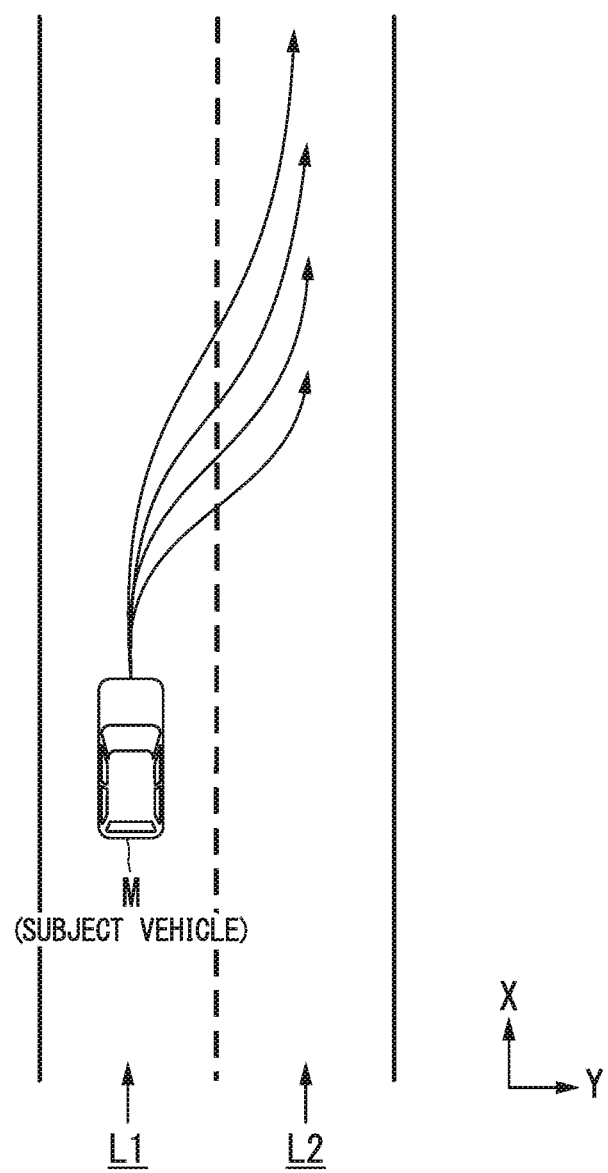
FIG. 7 is a diagram illustrating an example of a candidate for a trajectory generated by a trajectory candidate generation unit 146B.

The trajectory candidate generation unit 146B generates a candidate for the trajectory on the basis of the traveling aspect determined by the traveling aspect determination unit 146A. FIG. 7 is a diagram illustrating an example of the candidate for the trajectory generated by the trajectory candidate generation unit 146B. FIG. 7 shows a candidate for a trajectory in a case where the subject vehicle M changes the lane from a lane L1 to a lane L2.

Figure 8:
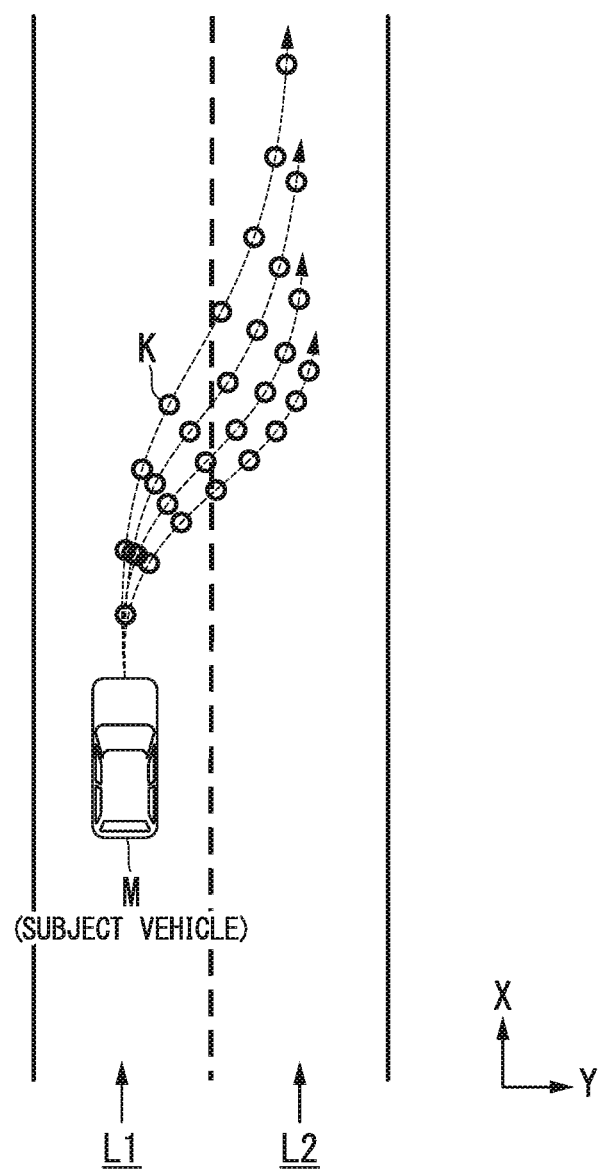
FIG. 8 is a diagram expressing the candidate for the trajectory generated by the trajectory candidate generation unit 146B by a trajectory point K.

For example, the trajectory candidate generation unit 146B determines a trajectory as shown in FIG. 7 as a collection of target trajectory positions (trajectory point K) to which a reference position (for example, a center of gravity or a rear wheel shaft center) of the subject vehicle M reaches, at a predetermined time interval in the future. FIG. 8 is a diagram expressing the candidate for the trajectory generated by the trajectory candidate generation unit 146B by the trajectory point K. As a distance between the trajectory points K is wider, the speed of the subject vehicle M becomes faster, and as the distance between the trajectory points K is narrower, the speed of the subject vehicle M becomes slower. Therefore, in a case of performing the acceleration, the trajectory candidate generation unit 146B gradually widens the distance between the trajectory points K, and in a case of performing the deceleration, the trajectory candidate generation unit 146B gradually narrows the distance between the trajectory points K.

As described above, since the trajectory point K includes a speed component, the trajectory candidate generation unit 146B needs to give a target speed to each of the trajectory points K. The target speed is determined according to the traveling aspect determined by the traveling aspect determination unit 146A.

Here, a method of determining the target speed in a case where the lane change (including a branch) is performed will be described. First, the trajectory candidate generation unit 146B sets a lane change target position (or a merge target position). The lane change target position is set as a relative position with respect to the nearby vehicle and determines "for which nearby vehicles a line is to be changed". The trajectory candidate generation unit 146B focuses on three nearby vehicles on the basis of the lane change target position and determines the target speed in a case where the lane change is performed.

Figure 9:
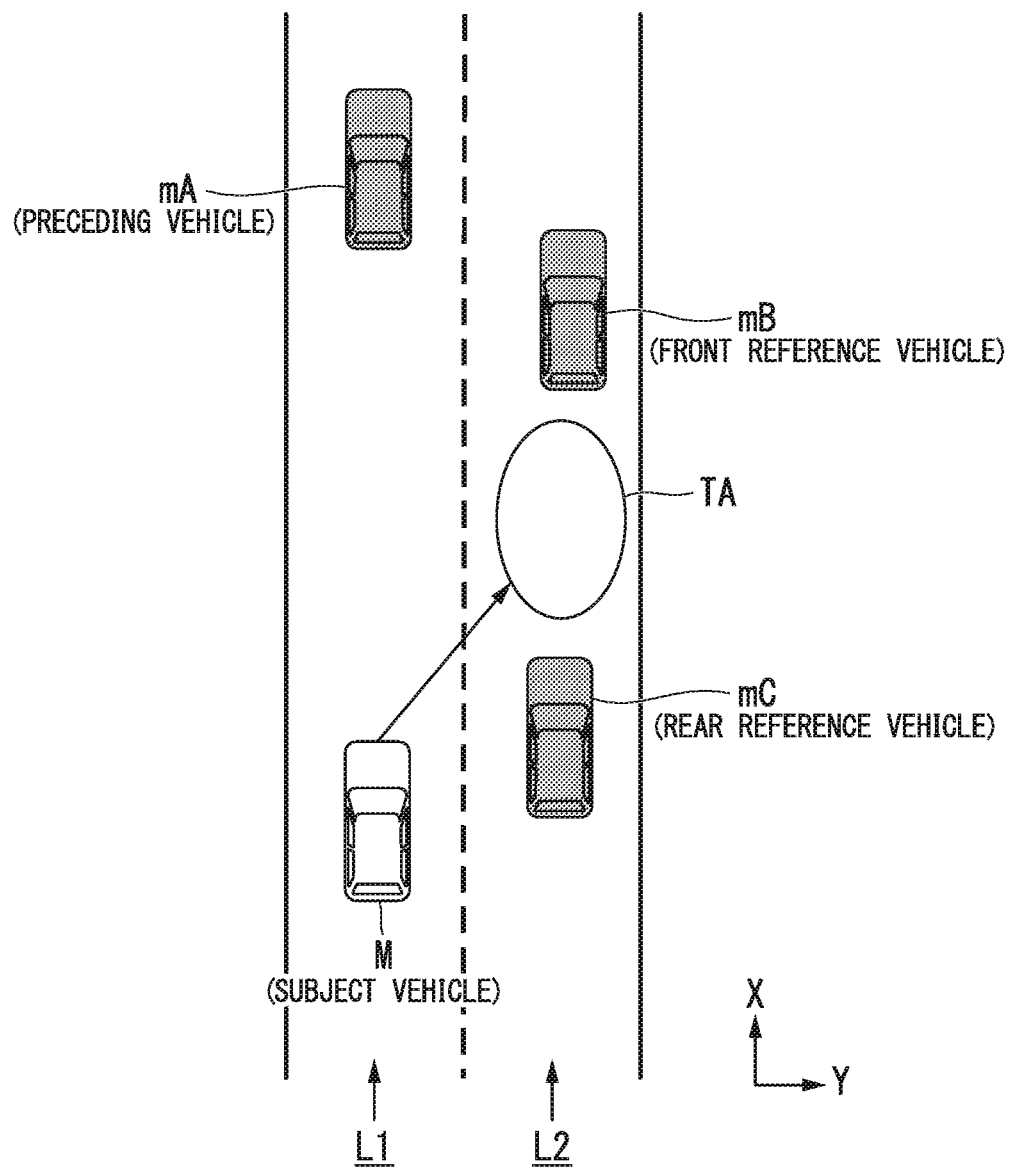
FIG. 9 is a diagram illustrating a lane change target position TA.

FIG. 9 is a diagram illustrating a lane change target position TA. In the drawing, L1 denotes the subject lane and L2 denotes an adjacent lane. Here, a nearby vehicle that travels immediately before the subject vehicle M will be referred to as a preceding vehicle mA, a nearby vehicle that travels immediately before the lane change target position TA will be referred to as a front reference vehicle mB, and a nearby vehicle that travels immediately after the lane change target position TA will be referred to as a rear reference vehicle mC on the same lane as the subject vehicle M. The subject vehicle M needs to accelerate or decelerate in order to move to a side of the lane change target position TA, but it is necessary to avoid catching up with the preceding vehicle mA at this time. Therefore, the trajectory candidate generation unit 146B predicts a future state of the three nearby vehicles and determines the target speed so as not to interfere with each nearby vehicles.

Figure 10:
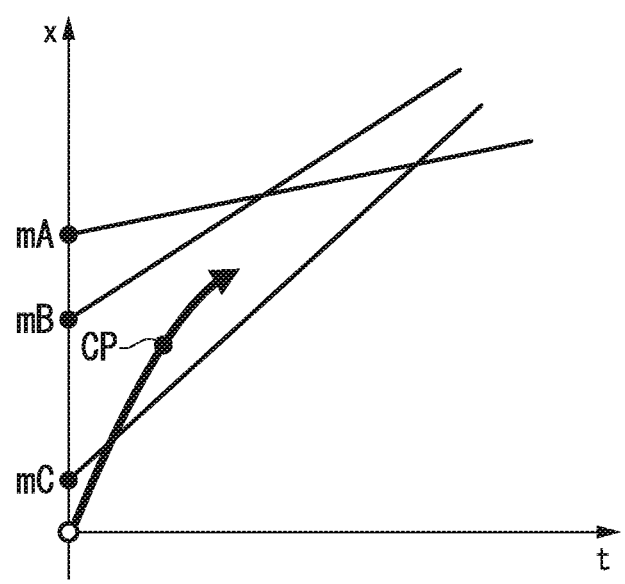
FIG. 10 is a diagram illustrating a speed generation model in a case where it is assumed that speeds of three nearby vehicles are constant.

FIG. 10 is a diagram illustrating a speed generation model in a case where it is assumed that speeds of the three nearby vehicles are constant. In the drawing, a straight line extending from mA, mB, and mC indicates a displacement in a traveling direction of a case where it is assumed that each nearby vehicle travels at a constant speed. The subject vehicle M is required to be present between the front reference vehicle mB and the rear reference vehicle mC at a point CP where the lane change is completed and is required to be present behind the preceding vehicle mA before the subject vehicle M is present between the front reference vehicle mB and the rear reference vehicle mC. Under such restriction, the trajectory candidate generation unit 146B derives a plurality of time series patterns of the target speed until the lane change is completed. In addition, a plurality of trajectory candidates as shown in FIG. 7 described above are derived by applying the time series patterns of the target speed to a model such as a spline curve. Note that motion patterns of the three nearby vehicles are not limited to the constant speed as shown in FIG. 10, but may be predicted on a premise of a constant acceleration and a constant jerk (jerk).

For example, the evaluation•selection unit 146C evaluates the candidate for the trajectory generated by the trajectory candidate generation unit 146B from two viewpoints of planning quality and safety and selects the trajectory to be output to the traveling control unit 160. For example, from the viewpoint of the planning quality, in a case where following to an already generated plan (for example, the action plan) is high and a total length of the trajectory is short, the trajectory is highly evaluated. For example, in a case where it is desired to perform the lane change to a right direction, a trajectory in which once the lane change is performed to a left direction and the subject vehicle is returned is lowly evaluated. From the viewpoint of the safety, for example, at each trajectory point, as a distance between the subject vehicle M and the object (the nearby vehicle or the like) is long and the acceleration or deceleration speed or a change amount of the steering angle is small, the trajectory is highly evaluated.

Figure 11:
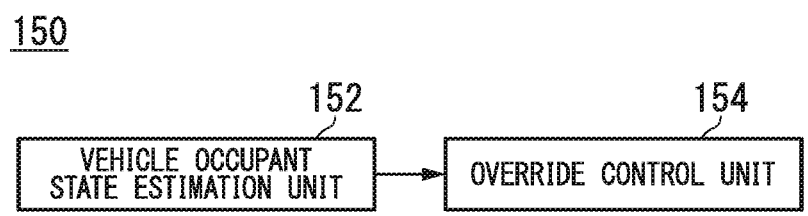
FIG. 11 is a diagram illustrating an example of a constitution of a switch control unit 150.

The switch control unit 150 switches between the automatic driving mode and the manual driving mode on the basis of a signal input from the automatic driving change-over switch 87. In addition, the switch control unit 150 performs the override for switching from the automatic driving mode to the manual driving mode on the basis of the operation from the vehicle occupant. In addition, the switch control unit 150 performs control to suppress the override according to the driving intention of the vehicle occupant. Here, FIG. 11 is a diagram illustrating an example of a constitution of the switch control unit 150. The switch control unit 150 includes a vehicle occupant state estimation unit (an estimation unit) 152 and an override control unit 154.

The vehicle occupant state estimation unit 152 estimates a state of the vehicle occupant of the subject vehicle M. For example, as a method of estimating the state of the vehicle occupant, the state of the vehicle occupant is estimated on the basis of information obtained from the seat on which the vehicle occupant is seated. For example, in a case where a backrest portion of a seat position is inclined by a predetermined angle or more, it is estimated that the driving intention of the vehicle occupant is low.

Figure 12:
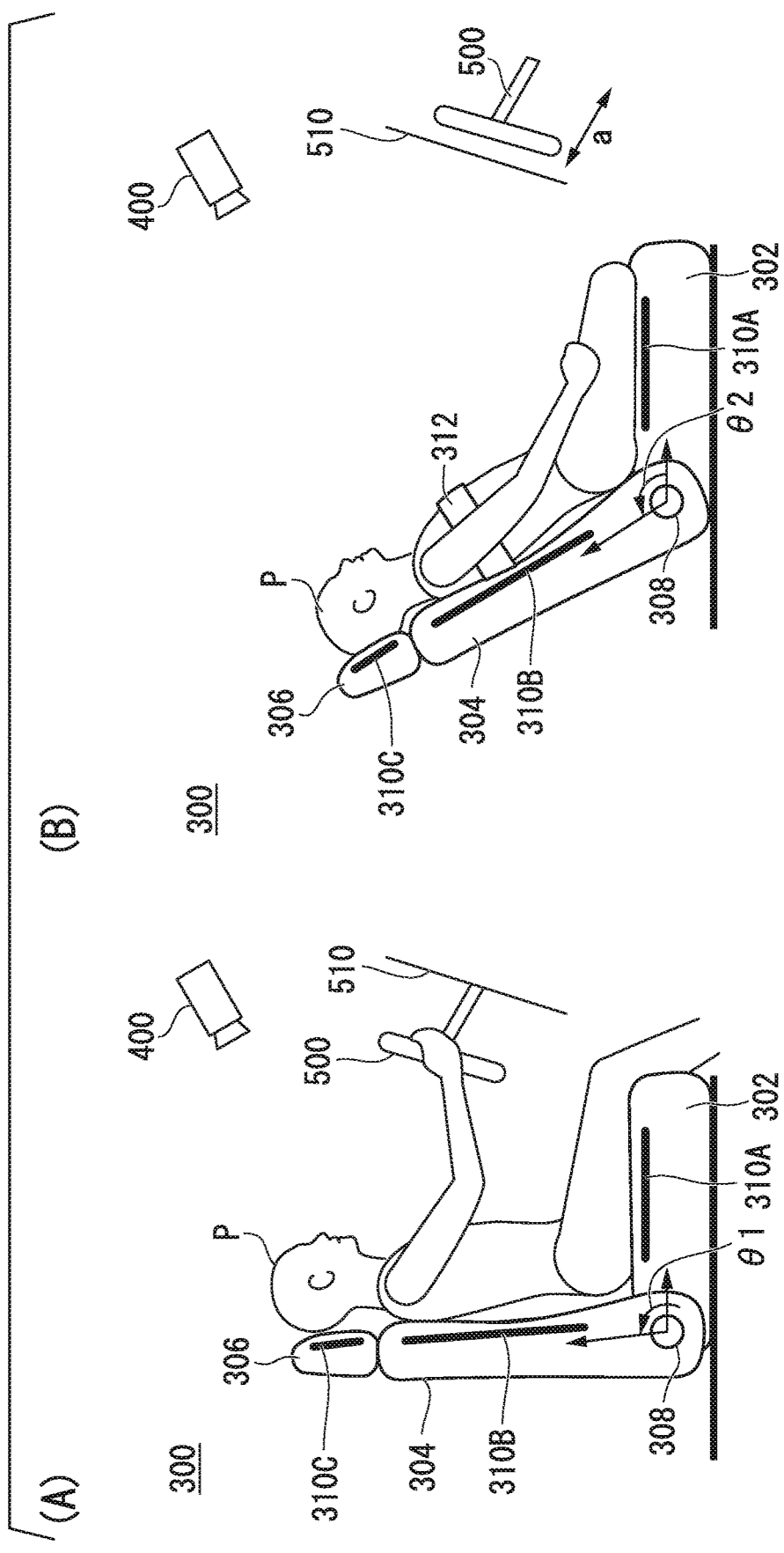
FIG. 12 is a diagram for explaining an aspect of state estimation of a vehicle occupant.

Here, FIG. 12 is a diagram for explaining an aspect of the state estimation of the vehicle occupant. In an example of FIGS. 12(A) and 12(B), a seat 300 on which the vehicle occupant is seated is shown as an example of the HMI 70. The seat 300 is an example of the seat 88 described above. In the example of FIG. 12, the seat 300 includes a seat portion (a seat cushion) 302, a backrest portion (a seat back) 304, a headrest 306, a reclining control portion 308, a load sensor 310, and a fixing portion 312. The relining control portion 308 has a mechanism that controls an angle (a reclining angle) formed by the seat portion 302 and the backrest portion 304. The reclining control portion 308 is able to acquire information on the angle described above. The load sensor 310 measures a load on the seat 300. In the example of FIGS. 12(A) and 12(B), a load sensor 310A for the seat portion 302, a load sensor 310B for the backrest portion 304, and a load sensor 310C for the headrest 306 are provided, but the present invention is not limited thereto. Each of the load sensors 310A to 310C may be, for example, a plate type, or a plurality of sensors arranged at regular distances.

For example, in a case where the subject vehicle M is in the automatic driving or the like, the fixing portion 312 fixes an attitude in a case where a vehicle occupant P sits cross-legged or the like as shown in FIG. 12(B). For example, the fixing portion 312 may be a belt type pulled out from the backrest portion 304 or may be a movable member provided on a side surface of the backrest portion 304. For example, as shown in FIG. 12(B), the fixing portion 312 may fix an armpit of the vehicle occupant P or may fix the vicinity of a waist or a crotch (for example, a protrusion member).

In addition, the subject vehicle M includes a vehicle interior camera (an imaging unit) 400 that images a space in the subject vehicle M as shown in FIG. 12. The reclining control unit 308, the load sensor 310, and the vehicle interior camera 400 described above are examples of the HMI 70 described above. The vehicle occupant state estimation unit 152 estimates the state of the vehicle occupant and determines the degree of the driving intention by the vehicle occupant from information obtained from at least one of the reclining control portion 308, the load sensor 310, and the vehicle interior camera 400. Note that the vehicle interior camera 400 is an example of the vehicle interior camera 95 described above.

For example, in a case where the reclining angle θ acquired from the reclining control portion 308 is equal to or greater than a predetermined angle (in a case where the backrest portion 304 is inclined by a predetermined angle or more), the vehicle occupant state estimation unit 152 determines that the driving intention by the vehicle occupant is low. Note that the vehicle occupant state estimation unit 152 determines that the driving intention is high in a case where the reclining angle θ is equal to or greater than a predetermined value.

In the example of FIG. 12(A), in a case where a reclining angle θ1 is smaller than a predetermined value Os, the vehicle occupant state estimation unit 152 determines that there is the driving intention by the vehicle occupant P. In this case, the override control unit 154 performs the override in a case where the operation of the steering wheel 500 by the vehicle occupant P satisfies the condition. On the other hand, as shown in FIG. 12(B), in a case where a reclining angle θ2 is the predetermined value Os, the vehicle occupant state estimation unit 152 determines that the driving intention by the vehicle occupant P is low. In this case, the override control unit 154 suppresses the override. In addition, for example, the suppression of the override is one or both of a case where the operation from the vehicle occupant P is not received (prohibited) at all or a case where the condition (the threshold value) for allowing the override is set high (causing the override is unlikely to be performed).

In addition, the vehicle occupant state estimation unit 152 acquires a load distribution of each of the load sensors 310A to 310C. For example, as shown in FIG. 12(A), in a case where the vehicle occupant P is able to grip the steering wheel 500, the load of the load sensor 310A is high and the load of the load sensors 310B and 310C is low. On the other hand, as shown in FIG. 12(B), in a case where the backrest portion 304 of the seat 300 is inclined, the load of the load sensors 310B and 310C by the vehicle occupant P increases. Therefore, the vehicle occupant state estimation unit 152 is able to estimate the degree of the driving intention by the vehicle occupant P on the basis of the respective load distributions acquired from the respective load sensors 310A to 310C.

For example, in a case where a difference of the loads by each of the load sensors 310A to 310C is equal to or less than a predetermined value, since the vehicle occupant P leans on the backrest portion 304 or the headrest 306 as shown in FIG. 12(B), it is able to be estimated that the driving intention of the vehicle occupant P is low. In addition, in a case where the difference of the loads by each of the load sensors 310A to 310C is greater than the predetermined value, the vehicle occupant state estimation unit 152 determines that the vehicle occupant P immediately grips the steering wheel 500 and is able to start the driving, and it is estimated that the driving intention by the vehicle occupant P is high as shown in FIG. 12(A).

In addition, in the present embodiment, the vehicle occupant state estimation unit 152 estimates and detects the state of the vehicle occupant P on the basis of the captured image of the vehicle occupant captured from the vehicle interior camera 400. For example, the vehicle occupant state estimation unit 152 detects an opening and closing motion of eyes or a line of sight direction by feature information such as a movement of a body or the eyes of the vehicle occupant P, and a luminance or a shape using an outline of a face as a reference, on the basis of the captured image of the vehicle interior camera 400. In addition, in a case where a state in which the eyes of the vehicle occupant P are closed is equal to or longer than a predetermined time, the vehicle occupant state estimation unit 152 estimates that the vehicle occupant P is sleeping and estimates that the driving intention of the vehicle occupant P is low. In addition, in a case where the line of sight is directed to the outside of the subject vehicle M (for example, a progress direction of the subject vehicle M) or in a case where the eyes are opened, the vehicle occupant state estimation unit 152 estimates that the driving intention of the vehicle occupant P is high.

In addition, for example, in a case where it is estimated that the vehicle occupant P sits cross-legged or leans on the steering wheel 500 by shape matching between an outline shape of the vehicle occupant P included in the image obtained from the vehicle interior camera 400 and an outline shape that is set in advance or the like, the vehicle occupant state estimation unit 152 estimates that the driving intention of the vehicle occupant is low. In addition, in a case where it is estimated that the fixing portion 312 for fixing the attitude by the vehicle occupant P is used on the basis of the image captured by the vehicle interior camera 400, the vehicle occupant state estimation unit 152 estimates that the vehicle occupant P is sleeping or taking a rest and estimates that the driving intention of the vehicle occupant P is low. Note that the fixing portion 312 may be provided with a sensor that detects fixing the attitude using the fixing portion 312 by the vehicle occupant P. In a case where the above-described sensor detects using the fixing portion 312, the vehicle occupant state estimation unit 152 estimates that the driving intention of the vehicle occupant P is low.

Note that the vehicle occupant state estimation unit 152 is able to derive (set) information (for example, a level value) obtained by converting the degree (high, low) of the driving intention described above to a numerical value. For example, in a case where the backrest portion 304 is inclined by the predetermined value Os or more and it is estimated that the vehicle occupant P is sleeping by the image from the vehicle interior camera 400, the level value is set to 1, and in a case where the backrest portion 304 is inclined by the predetermined value Os or more or it is estimated that the vehicle occupant P is sleeping by the image from the vehicle interior camera 400, the level value is set to 2. In addition, in a case where the reclining angle θ is less than the predetermined value Os, it is estimated that the driving intention is high and the level value is set to 5. Note that the setting contents of the level value are not limited thereto.

The vehicle occupant state estimation unit 152 estimates the state of the vehicle occupant P by comparing the information (the level value) obtained by converting the degree of the driving intention to the numerical value with a threshold value for estimating whether or not the driving intention of the vehicle occupant P is decreased, that is set in advance. For example, in a case where the level value is equal to or less than the above-described threshold value, the vehicle occupant state estimation unit 152 estimates that the driving intention is decreasing, and in a case where the level value is greater than the threshold value, the vehicle occupant state estimation unit 152 estimates that the driving intention is high.

In a case where the vehicle occupant state estimation unit 152 estimates that the driving intention of the vehicle occupant is low, the override control unit 154 controls the override so as to suppress the override (causes the override is unlikely to be performed or prohibits the override). In addition, for example, as shown in FIG. 12(B), the override control unit 154 may accommodate the steering wheel 500 that is an example of the operation element in a front frame portion 510 of the subject vehicle M according to the determination of the suppression of the override. It is possible to prevent the vehicle occupant P from operating the steering wheel 500 by accommodating the steering wheel 500 in the front frame portion 510. Note that the front frame portion 510 may be provided with an opening portion through which the steering wheel 500 is able to be move in a direction of an arrow a shown in FIG. 12(B) or may be provided with a door mechanism of an opening and closing type. In addition, the operation element is not limited to the steering wheel 500, but may be, for example, the accelerator pedal 71, the brake pedal 74, or the shift lever 76 described above. In addition, a plurality of the above-described respective operation elements may be accommodated respectively. The accommodation of each of the operation element described above is an example of the suppression of the override, and it is not absolutely necessary to accommodate each of the operation elements.

Note that the automatic driving control unit 120 may limit the lane change and/or the acceleration or deceleration of the subject vehicle M, in a case where the above-described level value is equal to or less than the threshold value and the override control unit 154 determines the suppression of the override. In this case, the automatic driving control unit 120 is able to perform stable traveling with a small amount of change with respect to the subject vehicle M and decrease a possibility that the vehicle occupant P performs an erroneous override, by limiting the lane change or the acceleration or deceleration as much as possible.

In addition, in a case where the above-described level value is greater than the threshold value, the override control unit 154 performs (allows) the override. In this case, the override control unit 154 returns the steering wheel 500 accommodated in the front frame portion 510 to an original position. In addition, for example, in a case where the operation for the constitution of the driving operation system in the HMI 70 is not detected for a predetermined time after switching the driving mode to the manual driving mode by the override, the override control unit 154 may return the mode to the automatic driving mode.

The traveling control unit 160 sets the driving mode to the automatic driving mode, the manual driving mode, or the like under the control of the switch control unit 150, and controls a control target including a part or all of the traveling driving force output device 200, the steering device 210, and the brake device 220 according to the set driving mode. Note that the traveling control unit 160 may suitably adjust a determined control amount on the basis of the detection result of the vehicle sensor 60.

For example, in a case where the automatic driving mode of the subject vehicle M is implemented, for example, the traveling control unit 160 controls the traveling driving force output device 200, the steering device 210, and the brake device 220 so that the subject vehicle M passes through the trajectory generated by the trajectory generation unit 146 at a scheduled time. In addition, in a case where the manual driving mode of the subject vehicle M is implemented, for example, the traveling control unit 160 outputs the operation detection signal input from the HMI 70 or the like as it is to the traveling driving force output device 200, the steering device 210, and the brake device 220. In addition, in a case where a semi-automatic driving mode of the subject vehicle M is implemented, for example, the traveling control unit 160 may control the steering device 210 so that the subject vehicle M travels along the trajectory generated by the trajectory generation unit 146 or may control the traveling driving force output device 200, and the brake device 220 so that the subject vehicle M travels at a predetermined speed. The HMI control unit 170 performs various controls on the driving operation system and/or the non-driving operation system of the HMI 70 on the basis of mode information and the like from the automatic driving control unit 120.

Next, processing contents of a case where the above-described various processes are executed by a program installed in an in-vehicle computer of the subject vehicle M will be described using a flowchart. In addition, in the following description, override control processing in the present embodiment will be mainly described, but the processing executed by the program above-described is not limited thereto, and various processes in the automatic driving control and the like of the subject vehicle M is able to be executed.

First Example

Figure 13:
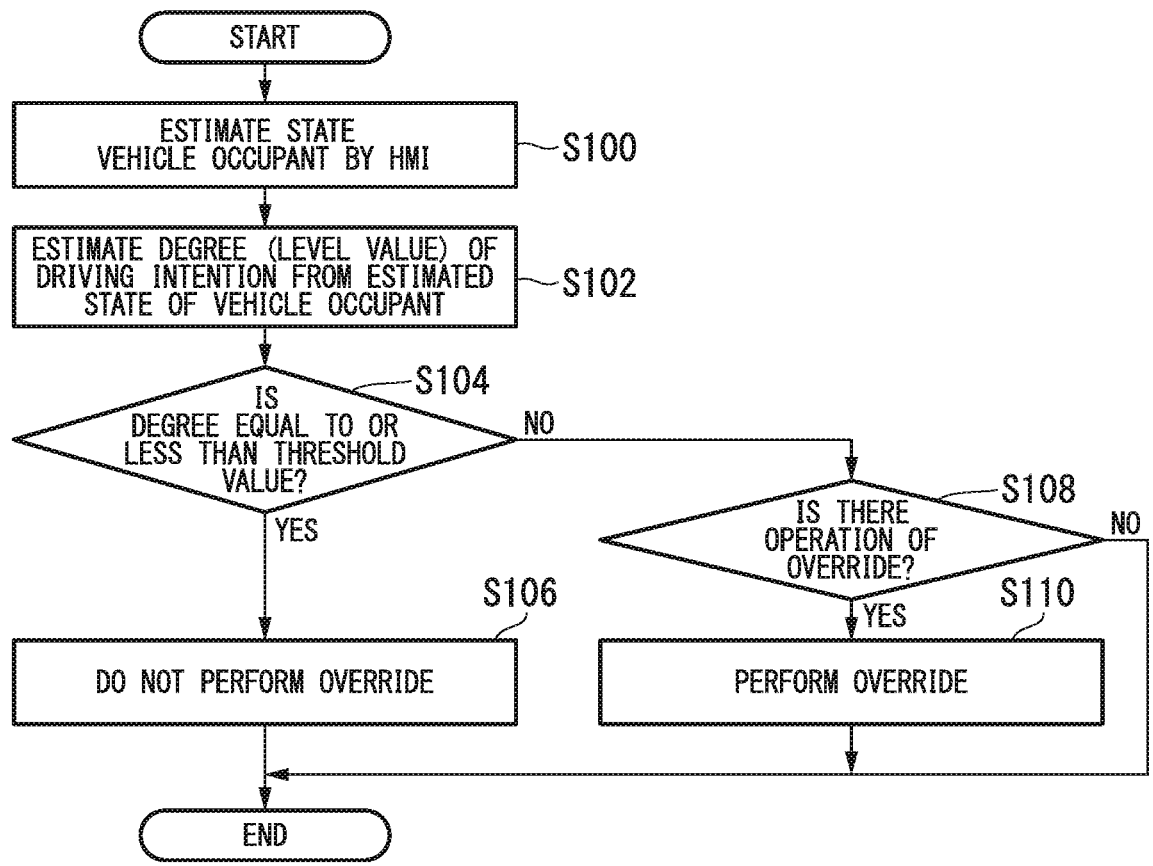
FIG. 13 is a flowchart illustrating a first example of override control processing.

FIG. 13 is a flowchart illustrating the first example of the override control processing. In the first example, first, the vehicle occupant state estimation unit 152 estimates the state of the vehicle occupant by the information obtained from the HMI 70 and the like (step S100). Next, the vehicle occupant state estimation unit 152 detects the degree (the level value) of the driving intention from the estimated state of the vehicle occupant (step S102) and determines whether or not the detected degree is equal to or less than the threshold value (step S104).

In a case where the degree of the driving intention is equal to or less than the threshold value, the override control unit 154 does not perform (prohibits) the override by the vehicle occupant (step S106) and ends the present flowchart.

In addition, in a case where the degree of the driving intention is not equal to or less than the threshold value, the override control unit 154 determines whether or not there is the operation of the override by the vehicle occupant (step 108). In a case where there is the operation of the override, the override control unit 154 performs (allows) the override (step S110) and ends the present flowchart. In addition, in a case where there is not the operation of the override, the override control unit 154 ends the present flowchart as it is. The flowchart shown in FIG. 13 is repeatedly executed at predetermined time intervals. Therefore, for example, even in a case where the degree is equal to or less than the threshold value and the override is suppressed, in a case where the degree is greater than the threshold value thereafter, the override is allowed.

According to the first example described above, in a case where the driving intention of the vehicle occupant of the subject vehicle M is decreasing, it is possible to suppress the override with respect to the operation for the HMI 70 of the vehicle occupant. Therefore, it is possible to suppress an implementation of an unsuitable override.

Second Example

Figure 14:
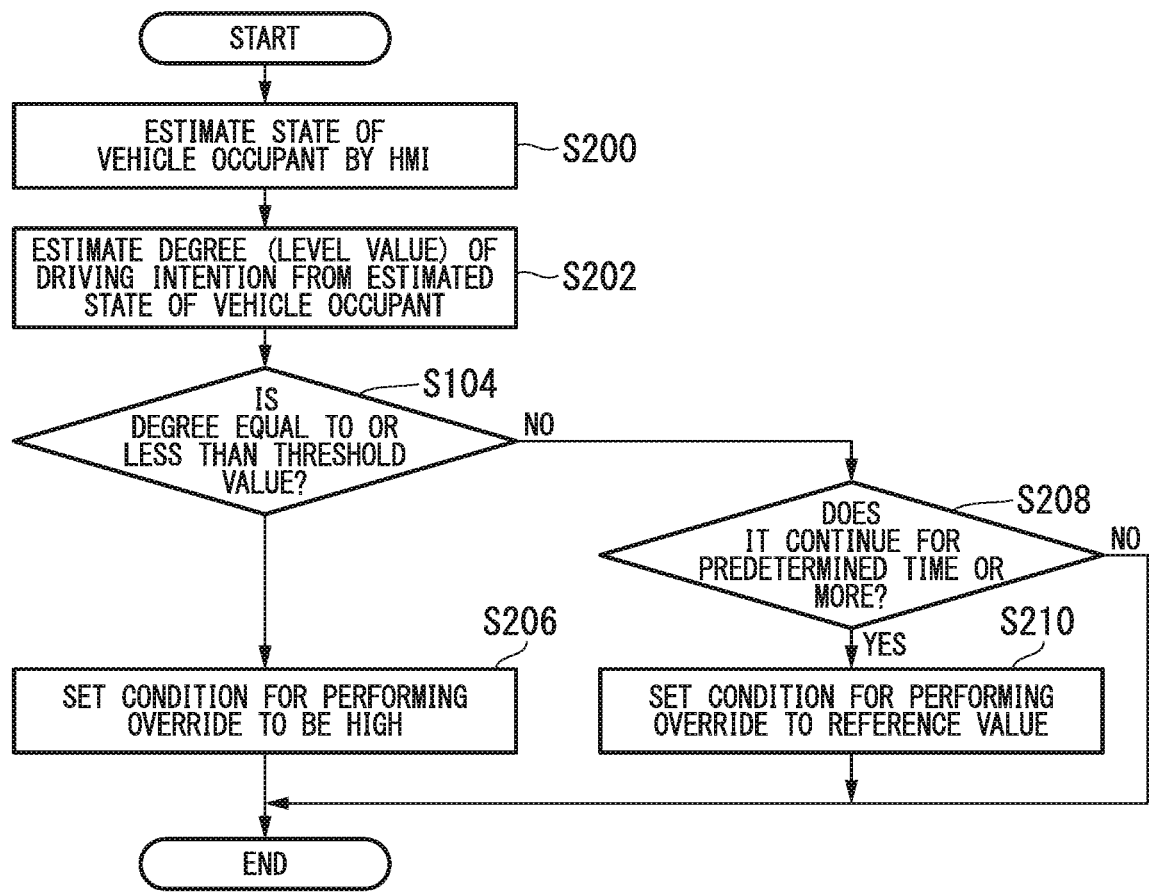
FIG. 14 is a flowchart illustrating a second example of the override control processing.

FIG. 14 is a flowchart illustrating the second example of the override control processing. In the second example, processing from step S200 to S204 is the same as the processing from step S100 to step S104 in the first example described above. Therefore, the specific description will be omitted here.

In step S204, in a case where the degree (the level value) of the driving intention of the vehicle occupant is equal to or less than the threshold value, the override control unit 154 sets the condition for performing the override on the operation for the driving operation system of the HMI 70 is to be high (step S206) and ends the present flowchart. In the processing of step S204, setting the condition for performing the override is to be high is setting the condition for performing the override to the side on which the override is unlikely to be performed.

For example, in a case where a continuous performance of the operation on the driving operation system of the HMI 70 for 3 seconds or more was set as the condition for performing the override, "3 seconds (reference value)" is changed to "5 seconds". In addition, in a case where the change of the steering angle of the steering wheel 78 that is the driving operation system of the HMI 70 by 15 degrees or more was set as the condition for performing the override, "15 degrees (reference value)" is changed to "30 degrees. In addition, in a case where the number of times of the operation for the driving operation system of the HMI 70 was set to be one time or more as the condition for performing the override, "one time (reference value)" is changed to "three times". Note that each of the numerical values described above is an example, and the present invention is not limited thereto. In addition, a target for which the condition is set to be high is not limited to the examples described above. For example, the target for which the condition is set to be high may be set such as a case where the condition for performing the override set with respect to the accelerator opening degree of the accelerator pedal 71 or the brake pressing amount of the brake pedal 74 is high.

In the second example, the threshold value (the reference value) for at least one condition among the plurality of conditions described above may be high. For example, in a case where the vehicle occupant state estimation unit 152 estimates that the vehicle occupant of the subject vehicle M sits in a cross-legged state or sleeping state, the override control unit 154 sets the threshold value for performing the override for the accelerator opening degree of the accelerator pedal 71 in the HMI 70 or the brake pressing amount of the brake pedal 74 to be high. In addition, in a case where the vehicle occupant state estimation unit 152 estimates that the vehicle occupant of the subject vehicle M is leaning on the steering wheel 78, the override control unit 154 sets the threshold value by the steering angle of the steering wheel 78 to be high. Therefore, even in a case where the vehicle occupant M operates the driving operation system of the HMI 70 without the driving intention, it is possible to immediately suppress the override.

In addition, in the processing of step S204, in a case where the degree of the driving intention of the vehicle occupant is greater than the threshold value, the override control unit 154 determines whether or not the state in which the degree of the driving intention of the vehicle occupant is greater than the threshold value continues for the predetermined time or more (step S208). For example, even in a case where the attitude of the vehicle occupant is temporarily suitable for driving, in a case where the attitude is immediately unsuitable for driving, the condition for performing the override is maintained as the state in which the condition is set to be high by performing the processing of step S208.

In a case where the state in which the degree of the driving intention is greater than the threshold value continues for the predetermined time or more, the override control unit 154 sets (returns) the condition (the threshold value) for performing the override, that is set high, as the reference value (step S210) and ends the present flowchart. Note that the processing of step S210 may not be performed in a case where the reference value has already been set to the threshold value. In addition, in a case where the state in which the degree of the driving intention is greater than the threshold value does not continue for the predetermined time or more, the current setting is maintained and the present flowchart is ended.

The flowchart shown in FIG. 14 is repeatedly executed at predetermined time intervals. Therefore, for example, since the degree of the driving intention by the vehicle occupant is equal to or less than the threshold value, even if the condition for performing the override is set to be high, in a case where the degree of the driving intention is greater than the threshold value and the state in which the degree of the driving intention is greater than the threshold value continues for the predetermined time or more, the override control unit 154 is able to return the condition (the threshold value) for performing the override to the reference value.

According to the second example described above, in a case where the driving intention of the vehicle occupant of the subject vehicle M is decreasing, it is possible to immediately suppress the override with respect to the operation to the HMI 70 of the vehicle occupant by setting the condition for performing the override to be high. Therefore, it is possible to suppress an implementation of an erroneous override. Note that the override control processing in the present embodiment may be an example in which part or all of the first example and the second example described above are combined with each other.

Although aspects for carrying out the present invention have been described above using the embodiments, the present invention is not limited to these embodiments at all, and various modifications and substitutions may be added without departing from the spirit of the present invention.

INDUSTRIAL APPLICABILITY

The present invention can be utilized in an automobile manufacturing industry.

REFERENCE SIGNS LIST

20 Viewfinder
30 Radar
40 Camera
DD Detection device
50 Navigation device
55 Communication device
60 Vehicle sensor
70 HMI
100 Vehicle control system
110 Target lane determination unit
120 Automatic driving control unit
130 Automatic driving mode control unit
140 Subject vehicle position recognition unit
142 External space recognition unit
144 Action plan generation unit
146 Trajectory generation unit
146A Traveling aspect determination unit
146B Trajectory candidate generation unit
146C Evaluation•selection unit
150 Switch control unit
152 Vehicle occupant state estimation unit
154 Override control unit
160 Traveling control unit
170 HMI control unit
180 Storage unit
200 Traveling driving force output device
210 Steering device
220 Brake device
300 Seat
310 Load sensor
312 Fixing portion
400 Vehicle interior camera
500 Steering wheel
M Subject vehicle

What is claim is:

1. A vehicle control system comprising:
an automatic driving control unit configured to automatically control at least one of acceleration or deceleration and steering of a subject vehicle;
an operation reception unit configured to receive an operation of a vehicle occupant of the subject vehicle;
an estimation unit configured to estimate a state of the vehicle occupant; and
an override control unit configured to perform an override for switching from automatic driving to manual driving based on the operation from the vehicle occupant and suppress the override in a response to estimation of a decrease of a driving intention of the vehicle occupant by the estimation unit,
wherein the override control unit suppresses the override by causing an operation element configured to receive a driving operation given by the vehicle occupant to move away from the vehicle occupant, according to a determination of suppression of the override.

2. The vehicle control system of claim 1, wherein, in response to determining that a fixing portion fixing a posture is used by the vehicle occupant, the estimation unit estimates that the driving intention of the vehicle occupant is low.

3. A vehicle control system comprising:
an automatic driving control unit configured to automatically control at least one of acceleration or deceleration and steering of a subject vehicle;
an operation reception unit configured to receive an operation of a vehicle occupant of the subject vehicle;
an estimation unit configured to estimate a state of the vehicle occupant;
an automatic driving mode control unit determines a mode of the automatic driving based on the operation of the vehicle occupant and a traveling state of the subject vehicle; and
an override control unit configured to perform an override for switching from automatic driving to manual driving based on the operation from the vehicle occupant received by the operation reception unit and suppress the override in a case where a decrease of a driving intention of the vehicle occupant is estimated by the estimation unit,
wherein, in a case in which suppression of the override is determined by the override control unit, the automatic driving control unit suppresses the override by switching from a first automatic driving mode to a second automatic driving mode by the automatic driving mode control unit,
wherein the first automatic driving mode is a mode to stable traveling with no amount of change by automatically executing acceleration or deceleration and steering of the subject vehicle, and
wherein the second automatic driving mode is a mode to stable traveling with a small amount of change by limiting a lane change and/or the acceleration or deceleration of the subject vehicle.

4. The vehicle control system of claim 3, wherein the override control unit suppresses the override by causing at least a part of an operation element configured to receive a driving operation given by the vehicle occupant to move away from the vehicle occupant according to a determination of suppression of the override.

5. A vehicle control method that causes an in-vehicle computer to:
automatically control at least one of acceleration or deceleration and steering of a subject vehicle;
receive an operation of a vehicle occupant of the subject vehicle by an operation reception unit;
estimate a state of the vehicle occupant;
perform an override for switching from automatic driving to manual driving based on the operation from the vehicle occupant received by the operation reception unit;

suppress the override in a case in which a decrease of a driving intention of the vehicle occupant is estimated based on the state of the vehicle occupant; and further suppress the override by causing an operation element configured to receive a driving operation given by the vehicle occupant to move away from the vehicle occupant, according to a determination of suppression of the override.

6. A non-transitory computer-readable storage medium storing a vehicle control program that causes a vehicle computer to:

automatically control at least one of acceleration or deceleration and steering of a subject vehicle;

receive an operation of a vehicle occupant of the subject vehicle by an operation reception unit;

estimate a state of the vehicle occupant;

perform an override for switching from automatic driving to manual driving based on the operation from the vehicle occupant;

suppress the override in a case in which a decrease of a driving intention of the vehicle occupant is estimated based on the state of the vehicle occupant; and further suppress the override by causing an operation element configured to receive a driving operation given by the vehicle occupant to move away from the vehicle occupant, according to a determination of suppression of the override.

* * * * *